(12) United States Patent
Chou (10) Patent No.: US 9,682,520 B2
(45) Date of Patent: *Jun. 20, 2017

(54) SEALANT DISPENSER

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,863

(22) Filed: Nov. 23, 2015

(65) Prior Publication Data

US 2016/0159017 A1  Jun. 9, 2016

(30) Foreign Application Priority Data

Dec. 4, 2014 (TW) .............................. 103142255 A (51) Int. Cl.
| | |
|---|---|
| *B29C 73/16* | (2006.01) |
| *B05B 7/24* | (2006.01) |
| *B29C 73/02* | (2006.01) |
| *B29L 30/00* | (2006.01) |

(52) U.S. Cl.
CPC .......... *B29C 73/166* (2013.01); *B05B 7/2491* (2013.01); *B29C 73/025* (2013.01); *B29L 2030/00* (2013.01)

(58) Field of Classification Search
CPC ... B29C 73/025; B29C 73/166; B05B 7/2491; B29L 2030/00
USPC ............................................. 141/38; 152/415
See application file for complete search history.

(56) References Cited

U.S. PATENT DOCUMENTS

| | | | | | |
|---|---|---|---|---|---|
| 4,765,367 | A * | 8/1988 | Scott | ..................... | B29C 73/166 137/597 |
| 7,854,242 | B2 * | 12/2010 | Stehle | ................... | B29C 73/166 141/38 |
| 8,016,002 | B2 * | 9/2011 | Yoshida | ................ | B29C 73/166 141/38 |
| 8,336,581 | B2 * | 12/2012 | Lolli | ..................... | B29C 73/166 141/38 |
| 8,453,683 | B2 * | 6/2013 | Yoshida | ................ | B29C 73/166 141/105 |
| 8,517,063 | B2 * | 8/2013 | Kanenari | .............. | B29C 73/166 141/105 |
| 9,050,866 | B2 * | 6/2015 | Hong | ..................... | B29C 73/166 |
| 9,365,000 | B2 * | 6/2016 | Taniguchi | ............. | B29C 73/166 |
| 9,457,367 | B2 * | 10/2016 | Wang | .................... | B05B 7/2402 |
| 9,545,763 | B2 * | 1/2017 | Chou | .................... | B29C 73/166 |

(Continued)

FOREIGN PATENT DOCUMENTS

DE  102007053241 A1 *  5/2009  ........... B29C 73/166

*Primary Examiner* — Nicolas A Arnett (57) ABSTRACT

A sealant dispenser is disclosed, which can cooperate with an air compressor for repairing punctured tires. The sealant dispenser generally includes a bottle with a top opening being filled with a chemical sealant, a cap capable of covering the top opening of the bottle, a control element that normally closes an air input connection tube and a sealant output connection tube provided at the cap, and a swing element. In use, the air input connection tube is connected to an air compressor, and the sealant output connection tube is connected to a punctured tire. The serving element is operated to conduct a semicircle swing to allow the compressed air of the air compressor to flow into the bottle to force the chemical sealant to flow into the interior of the punctured tire for repairing the tire.

5 Claims, 6 Drawing Sheets

(56) References Cited

U.S. PATENT DOCUMENTS

| | | | | |
|---|---|---|---|---|
| 2005/0284536 A1* | 12/2005 | Kojima | ............... | B29C 73/025 |
| | | | | 141/38 |
| 2008/0230142 A1* | 9/2008 | Hickman | ............. | B29C 73/166 |
| | | | | 141/38 |
| 2009/0107578 A1* | 4/2009 | Trachtenberg | ........ | B05B 9/0805 |
| | | | | 141/5 |
| 2009/0277534 A1* | 11/2009 | Yoshida | ............... | B29C 73/166 |
| | | | | 141/38 |
| 2011/0192492 A1* | 8/2011 | Kanenari | ............. | B29C 73/166 |
| | | | | 141/38 |
| 2013/0199666 A1* | 8/2013 | Nakao | ................. | B29C 73/166 |
| | | | | 141/38 |
| 2013/0284312 A1* | 10/2013 | Chou | ................... | B29C 73/166 |
| | | | | 141/38 |
| 2013/0284313 A1* | 10/2013 | Kojima | ................ | B29C 73/166 |
| | | | | 141/38 |
| 2014/0261878 A1* | 9/2014 | Jhou | .................... | B29C 73/163 |
| | | | | 141/38 |
| 2014/0283949 A1* | 9/2014 | Hong | .................. | B29C 73/166 |
| | | | | 141/52 |
| 2016/0121563 A1* | 5/2016 | Chou | ................... | B29C 73/166 |
| | | | | 141/38 |
| 2016/0136906 A1* | 5/2016 | Chou | ................... | B29C 73/025 |
| | | | | 141/38 |

* cited by examiner

SEALANT DISPENSER

TECHNICAL FIELD OF THE INVENTION

The present invention relates to a sealant dispenser and, more particularly, to a sealant dispenser which comprises a bottle, a cap, and a serving element, wherein the bottle contains a chemical sealant, the cap is mounted to the bottle and provided with an air input connection tube for connecting to an air compressor, and a sealant output connection tube for connecting to a punctured tire, and the serving element can be swung to move an elongated rod downwardly for actuating a control element, so that the compressed air of the air compressor can flow into the bottle to force the chemical sealant contained in the bottle to flow out of the sealant output connection tube to be delivered to the punctured tire, so that the tire can be inflated and repaired effectively and reliably.

DESCRIPTION OF THE PRIOR ART

Most of conventional sealant dispensers include a bottle, a cap, and a tube. The bottle is filled with a chemical sealant, which can be used to repair punctured tires. The cap is provided with an inlet for receiving compressed air from an air compressor and an outlet for delivering the chemical sealant to an object such as a tire. The tube is mounted with the cap and inserted into the bottle. In operation, the compressed air can flow into the bottle via the inlet to force the chemical sealant to pass through the tube and finally flow into a punctured tire via the outlet and a hose connected between the outlet and the air nozzle of the tire, so that the punctured tire can be repaired.

The applicant intends to develop a sealant dispenser with an improved structure, which can be operated more effectively, conveniently and reliably than conventional ones.

SUMMARY OF THE INVENTION

One object of the present invention is to provide a sealant dispenser, which comprises a bottle, a cap, a control element, and a serving element. The bottle is filled with a chemical sealant. The cap is mounted to the bottle for covering a top opening of the bottle, wherein the cap defines an air passage for receiving compressed air from an air compressor and defines a sealant passage for delivering the chemical sealant to an object. The control element is mounted in the bottle for controlling the air passage and the sealant passage, wherein the air passage and the sealant passage are closed by the control element when the sealant dispenser is not in use. The serving element is pivotally mounted on the cap for actuating the control element to open the air passage and the sealant passage, so that the compressed air can flow into the bottle to deliver the chemical sealant to the object via the sealant passage.

According to one feature of the present invention, the serving element can be swung about a pivotal axis to move an elongated rod downwardly, which in turn move the control element downwardly to open the air passage and the sealant passage to allow the compressed air to enter the bottle and to force the chemical sealant to flow out of the sealant passage to be delivered to an object.

According to another feature of the present invention, the cap is integrally formed with an upper pipe thereon and a lower pipe thereunder. The upper pipe is formed with two opposite supporting plates at its top, thus defining a gap between the supporting plates. Each supporting plate defines a pivot hole. One of the supporting plates has an extension, on which an engagement protrusion with a slant surface is provided. The upper and lower pipes respectively define inner passages communicating with each other. A step is formed at the inner passage of the lower pipe. The diameter of the upper pipe is generally greater than the diameter of the lower pipe. The upper pipe is provided with an air input connection tube defining the air passage and provided with a sealant output connection tube defining the sealant passage. The cap is provided at its inner surface with a short tube and defines therein an intermediate channel, which allows the air passage to communicate with the short tube. The air passage of the air input connection tube communicates with the inner space of the bottle via the intermediate channel that communicates with the short tube. The sealant passage of the sealant output connection tube communicates with the inner passage of the upper pipe. A compression spring is fitted into the upper pipe such that it is in contact with the step formed at the inner passage of the lower pipe. The elongated rod with an enlarged top end is fitted into the inner passages of the upper and lower pipes and inserted through the compression spring, so that the compression spring is fitted around the elongated rod, between the top end of the elongated rod and the step of the lower pipe. The control element is fitted around the lower pipe of the cap to close the intermediate channel and the inner passage of the lower pipe. The serving element is pivotally mounted to the pivot holes, between the supporting plates of the upper pipe, such that the swing element urges against the top end of the elongated rod, and the serving element can swing about the pivotal holes in a semicircle. In use, the serving element may be swung to move the elongated rod downwardly to actuate the control element, so that the air passage of the air input connection tube and the inner passage of the lower pipe can be opened to allow the compressed air to flow into the inner space of the bottle to force the chemical sealant to flow into the inner passage of the lower pipe and the inner passage of the upper pipe and finally enter a punctured tire through the sealant passage and a hose connected to the sealant passage for inflating and repairing the punctured tire.

Other objects, advantages, and novel features of the present invention will become more apparent from the following detailed description when taken in conjunction with the accompanying drawings.

DETAILED DESCRIPTION OF THE PREFERRED EMBODIMENTS

The present invention provides a sealant dispenser 1, which can cooperate with an air compressor for repairing punctured tires, wherein a bottle 2 is used to store a chemical sealant 26, a cap 3 is mounted over a top opening 21 of the bottle 2, a control element 5 is used to open or close an air passage 33 and a sealant passage 35. In operation, a user may swing a serving element 4 provided on the cap 3 about a pivot axis to open the air passage 33 and the sealant passage 35, to allow compressed air supplied from the air compressor to flow into the bottle 2 by way of the air passage 33, and thus the chemical sealant 26 can be forced to flow out of the bottle 2 via the sealant passage 35. A detailed illustration of one embodiment of the present invention is provided in the following paragraphs.

Figure 1:
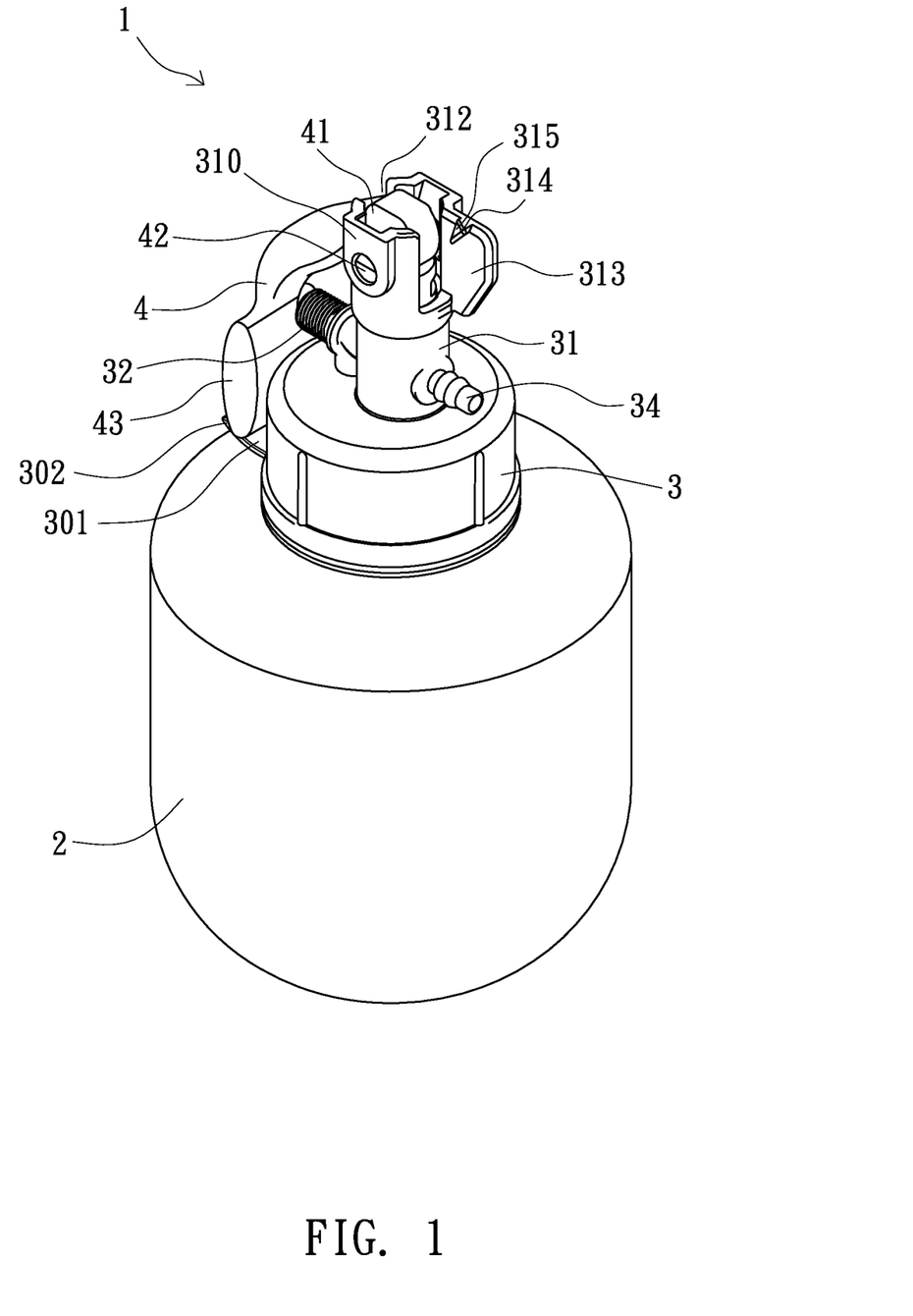
FIG. 1 shows a 3-dimensional view of a sealant dispenser according to one embodiment of the present invention.
Figure 2:
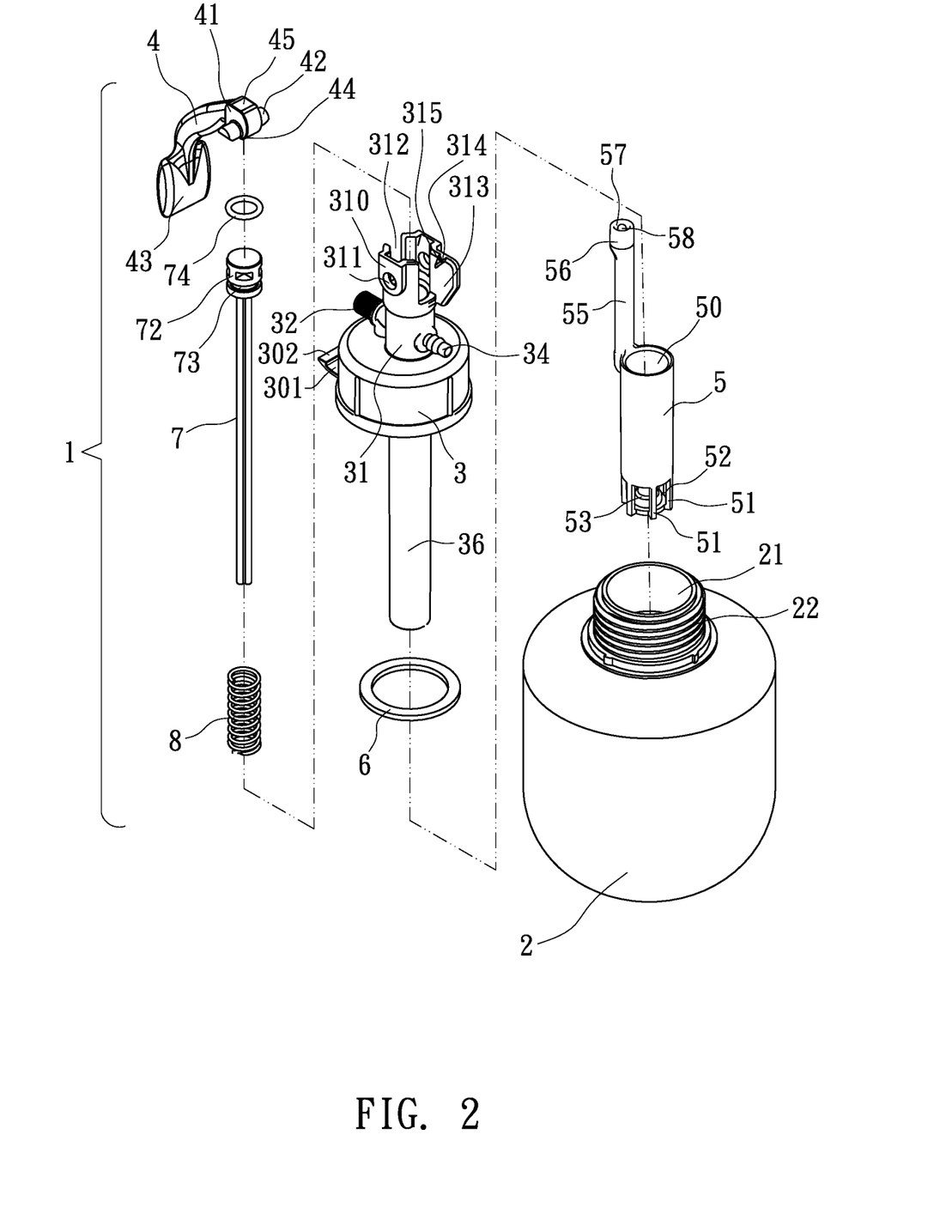
FIG. 2 shows an exploded view of the sealant dispenser.
Figure 5:
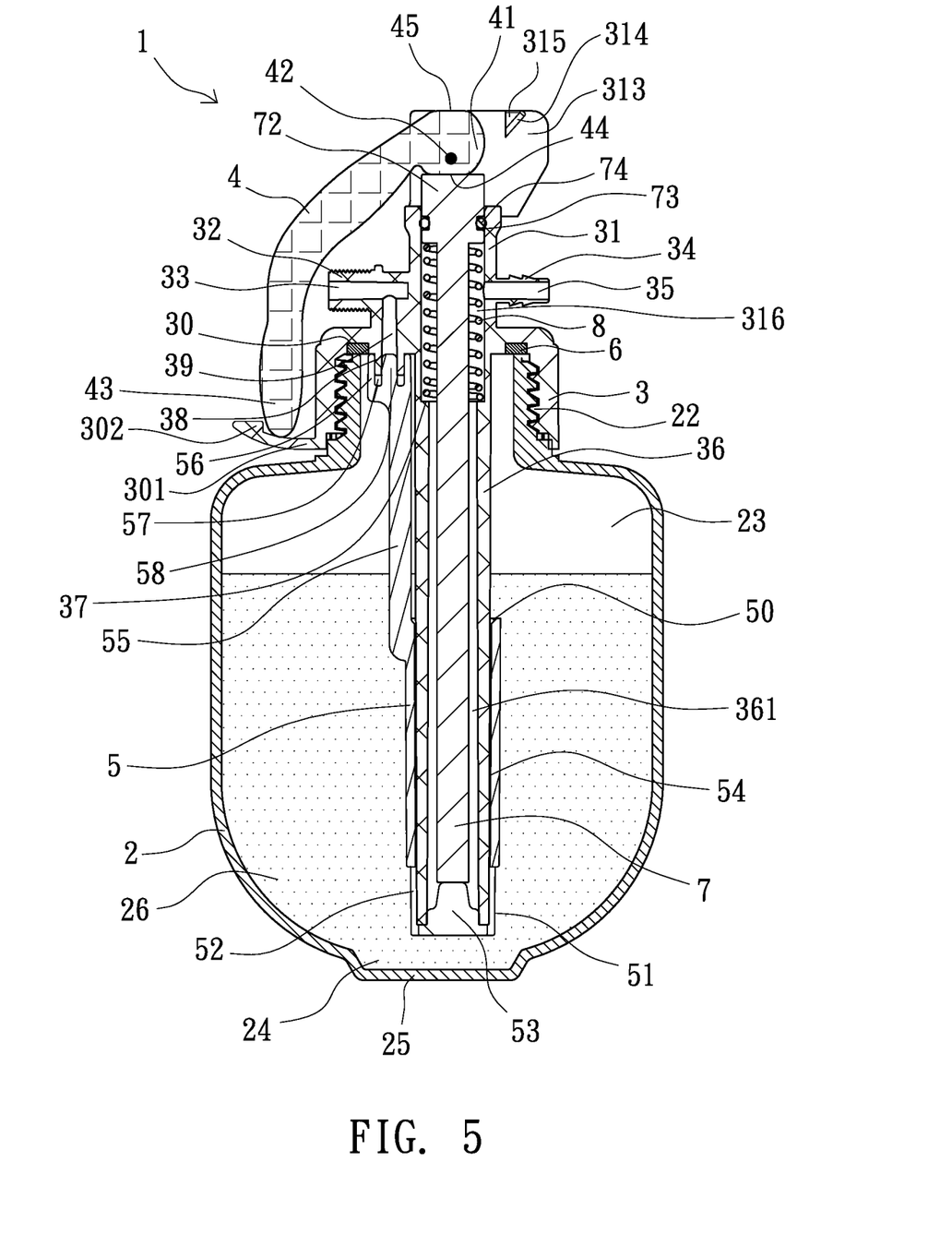
FIG. 5 shows a schematic view of the sealant dispenser, which is at its initial state.

Referring to FIGS. 1, 2 and 5, the sealant dispenser 1 generally comprises the bottle 2 and the cap 3. The bottle 2 defines therein an inner space 23. The bottle 2 has a neck portion, which defines a top opening 21, and a flat bottom 25 opposite to the top opening 21. The neck portion of the bottle 1 is provided with external threads 22. A recessed space 24, which constitutes part of the inner space 23, is defined above the flat bottom 25. A chemical sealant 26, which can repair punctured tires, is stored in the inner space 23 of the bottle 2.

The cap 3 is threadedly mounted to the neck portion of the bottle 2 which defines the top opening 21. The cap 3 defines at its inner surface an annular groove 30 to be fitted with a gasket 6, which allows the cap 3 to seal the top opening 21 of the bottle 2 more properly. The cap 3 is provided at its bottom edge with an arc-shaped plate 301, which extends outwardly, generally in the direction of the air input connection tube 32. A distal end of the arc-shaped plate 301 is provided with a hook portion 302. An upper pipe 31, which is integrally formed with the cap 3, extends upwardly from the top of the cap 3. A lower pipe 36, which is integrally formed with the cap 3, extends downwardly from the inner surface of the cap 3. The upper pipe 31 defines an inner passage 316 while the lower pipe 36 defines an inner passage 361. The inner passage 316 of the upper pipe 31 communicates with the inner passage 361 of the lower pipe 36. The upper pipe 31 is formed with two opposite supporting plates 310 at its top, thus defining a gap 312 between the supporting plates 310. Each of the supporting plates 310 defines a pivot hole 311. One of the supporting plates 310 has an extension 313 on which an engagement protrusion 314 with a slant surface 315 is provided. Furthermore, the upper pipe 31 is provided with an air input connection tube 32 and a sealant output connection tube 34. The air input connection tube 32 defines the air passage 33. The inner surface of the cap 3 is provided with a short tube 38, which communicates with an intermediate channel 39 defined in the cap 3. The air passage 33 can communicate with the inner space 23 of the bottle 2 via the intermediate channel 39 that communicates with the short tube 38. The sealant output connection tube 34 defines the sealant passage 35. The sealant passage 35 communicates with the inner passage 316 of the upper tube 31. A step 37 is formed at the inner passage 361 of the lower pipe 36. Generally, the inner passage 316 of the upper pipe 31 has a diameter greater than the inner passage 361 of the lower pipe 36

A compression spring 8 is fitted into the upper pipe 31 via the top open end of the upper pipe, such that it is in contact with the step 37 formed at the inner passage 361 of the lower pipe 36.

Figure 4:
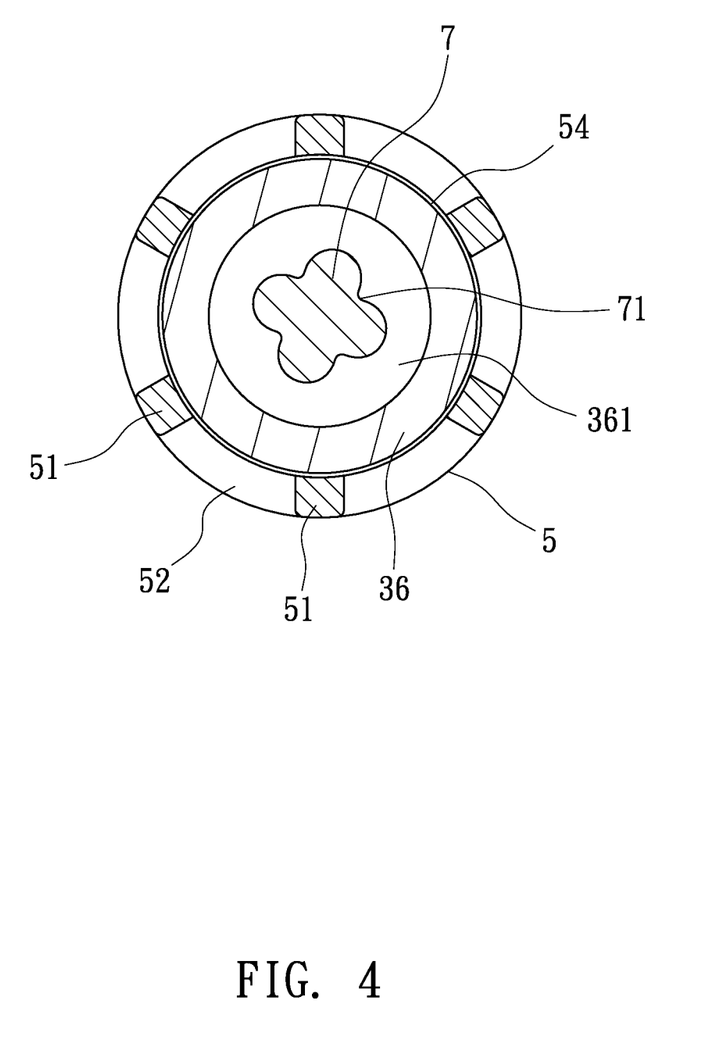
FIG. 4 shows a sectional view of the assembled structure taken along line A-A in FIG. 3.

A non-circular elongated rod 7 has an enlarged top end 72 defining an annular groove 73 to be fitted with an O-ring 74. Furthermore, the elongated rod 7 defines multiple longitudinal grooves 71 along its path other than the top end 72 (see FIG. 4). The elongated rod 7 is fitted into the inner passage 316 of the upper pipe 31 and the inner passage 361 of the lower pipe 36 via the top open end of the upper pipe 31, such that the compression spring 8 is fitted around the elongated rod 7, between the top end 72 and the step 37 of the lower pipe 36.

The control element 5 has a tube and a stem 55. The tube of the control element 5 defines therein a central bore 54 which opens out at a top opening 50 thereof. Furthermore, the tube of the control element 5 is provided at its bottom with multiple strips 51 and defines multiple gaps 52 between the strips 51. An inner stepped plug 53 is attached to lower ends of the strips 51 and surrounded by the multiple gaps 52. The stem 55 extends upwardly from the end of the tube which defines the top opening 50. A distal end of the stem 55 is formed into an upper plug 56 which has a central pin 58 and defines an annular cavity 57 around the central pin 58. The lower pipe 36 can be inserted into the central bore 54 of the tube of the control element 5 via the top opening 50 such that a lower end of the lower pipe 36 is snugly fitted over the inner stepped plug 53 and thus closes the inner passage 361 of the lower pipe 36, and a lower end of the elongated rod 7 is in contact with the stepped plug 53. The central pin 58 of the upper plug 56 can be inserted into the short tube 38 to block the intermediate channel 39 that communicates with the air passage 33 of the air input connection tube 32. At the same time, the annular cavity 57 can be snugly fitted around the short tube 38.

A serving element 4 has an eccentric cam 41 at its one end. The eccentric cam 41 is provided with two pivot pins 42 at its two opposite sides. An opposite end of the serving element 4 is provided with an operating bar 43. The serving element 4 is located between the two support plates 310 of the upper pipe 31 and pivotally mounted on the cap 3 by fitting the pivot pins 42 into the pivot holes 311 of the supporting plates 310 of the upper pipe 31, such that the eccentric cam 41 urges against the top end 72 of the elongated rod 7. The gap 312 between the two opposite plates 310 allows the serving element 4 to conduct a semicircle swing about the pivot holes 311 of the two plates 310.

The compression spring 8, the elongated rod 7, the control element 5, and the serving element 4 are assembled to the cap 3. The assembled cap is then mounted to the bottle 2, wherein the lower pipe 36 of the cap 3, most of the elongated rod 7, the control element 5 are located in the inner space 23 of the bottle 2 (see FIGS. 2 and 5).

Figure 3:
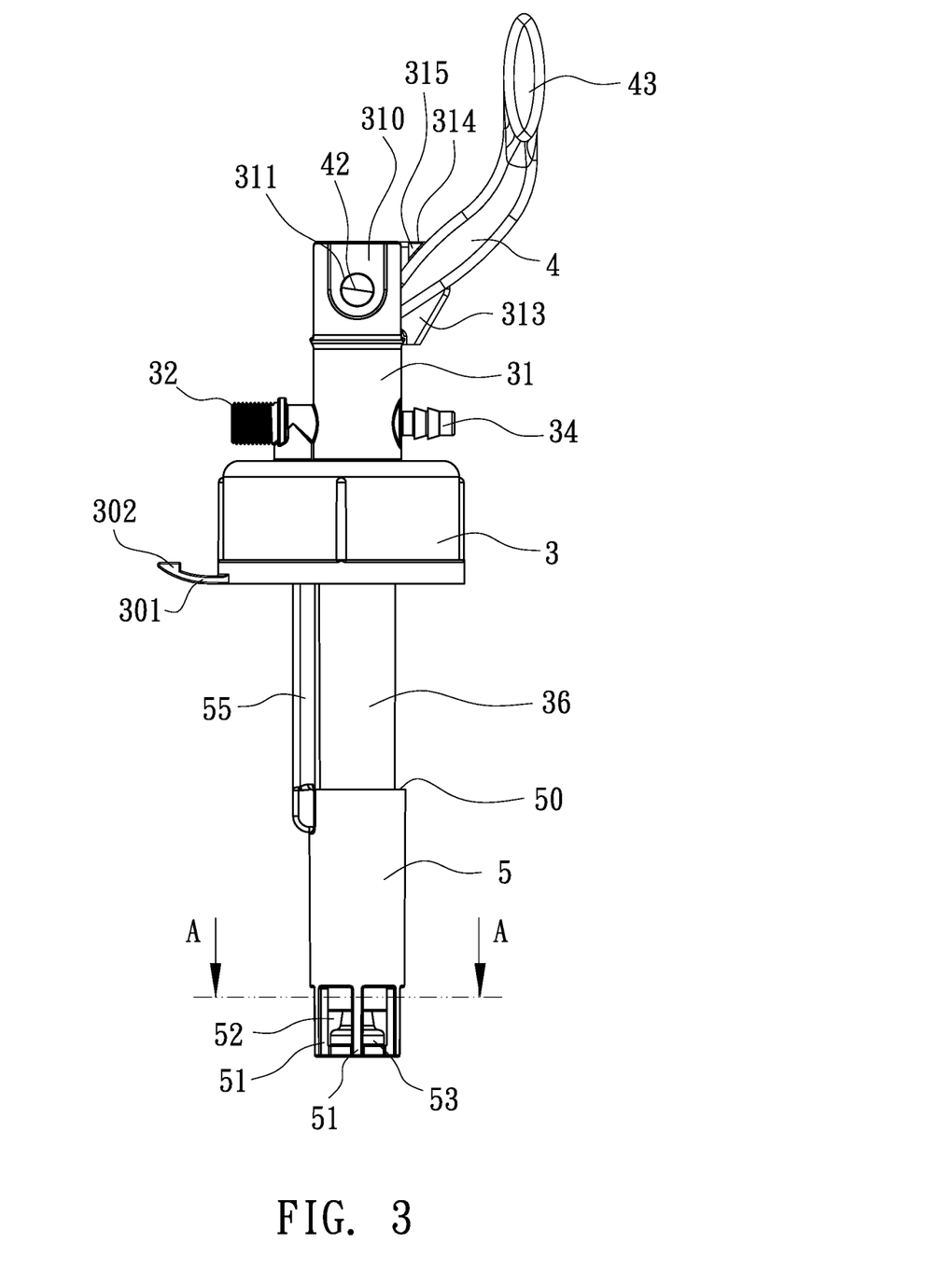
FIG. 3 shows a plan view of an assembled structure consisting of a cap, a control element, and a serving element used in the sealant dispenser.
Figure 6:
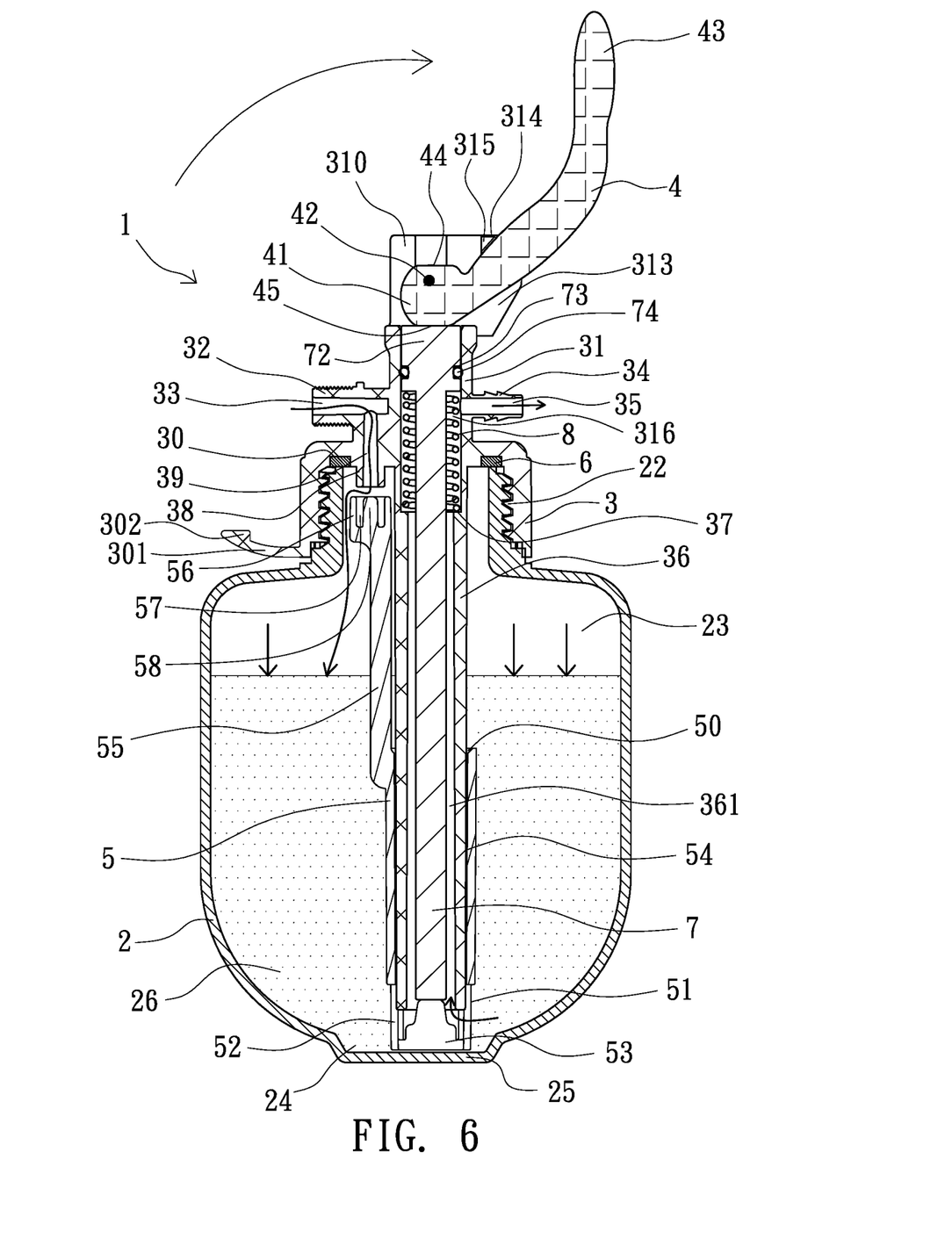
FIG. 6 shows a schematic view of the sealant dispenser, which demonstrates the air flow and the sealant flow after the serving element has been swung.

FIG. 5 shows a initial state of the sealant dispenser 1; namely, the sealant dispenser 1 is not in use, wherein the intermediate channel 39 is blocked by the upper plug 56 of the control element 5, the lower pipe 36 is blocked by the inner stepped plug 53 of the control element 5, and the elongated rod 7 is in contact with the inner stepped plug 53. As shown, the intermediate channel 39 does not communicate with the inner space 23 of the bottle 2, and the inner passages 316, 361 of the upper and lower pipes 31, 36 do not communicate with the inner space 23 of the bottle 2. In this state, the operating lever 43 of the serving element 4 is located in front of the air input connection tube 32 and retained by the hook portion 302 of the arc-shaped plate 301 of the cap 3, and this can remind a user of the sealant dispenser being in a closed condition. In use, a user may use a hose (not shown) connected between the sealant output connection tube 34 and the air nozzle of a punctured tire, and then use another hose (not shown) connected between the air input connection tube 32 and an air compressor. Thereafter, the user can swing the serving element 4 to conduct a semicircle rotation for activating the sealant dispenser 1. The swing operation of the serving element 4 allows the surface 45 of the eccentric cam 41, which has a longer distance from the pivot pins 42 than the surface 44, to come into contact with the top end 72 of the elongated rod 7 (see FIG. 6), wherein the serving element 4 can go past the slant surface 315 of the engagement protrusion 314 to engage with the engagement protrusion 314. As such, the elongated rod 7 can be moved downwardly, and the compression spring 8 can be compressed by the elongated rod 7. The inner stepped plug 53, which is in contact with the lower end of the elongated rod 7, can be forced by the elongated rod 7 to have the control element 5 moved downwardly, so that the upper plug 56 of the control element 5 can be removed from the short tube 38 of the cap 3, and the inner stepped plug 53 can be removed from the lower pipe 36. Consequently, the intermediate channel 39 and the inner passages 316, 361 of the upper and lower pipes 31, 36 can communicate with the inner space 23 of the bottle 2, so that the compressed air can flow into the inner space 23 of the bottle 2 via the air passage 33 of the air input connection tube 32 and the intermediate channel 39 to act upon the surface of the chemical sealant 26. Thus, the chemical sealant 26 is forced by the compressed air to flow into the inner passage 361 of the lower pipe 36 via the gaps 52 of the control element 5 (see also FIG. 3), and then flow into the inner passage 316 of the upper pipe 31 (see also FIG. 4). Finally, the chemical sealant 26 can flow out of the sealant passage 35 to enter a punctured tire by way of the hose connected between the sealant output connection tube 34 and the air nozzle of the punctured tire. In particular, after the sealant dispenser has been used for a period of time, although the amount of the chemical sealant 26 contained in the bottle 2 is reduced, the recessed space 24 above the flat bottom 25 of the bottle 2 can facilitate collecting the remaining sealant in the bottle 2, so that the remaining sealant can be effectively used by the control element 5 without leftover.

In view of the foregoing, the sealant dispenser 1 of the present invention, which employs the cap 3 mounted to the bottle 2, wherein the cap 3 is provided with the air input connection tube 32 for receiving compressed air from an air compressor, and the sealant output connection tube 34 for delivering the chemical sealant 26 to a punctured tire. In operation, a user may swing the serving element 4 to have the elongated rod 7 move the control element 5 downwardly for allowing the compressed air to flow into the bottle 2 to force the chemical sealant 26 to flow into the inner passages 316, 361 of the upper and lower pipes 31, 36, and finally flow out of the sealant passage 34 to enter a punctured tire, so that the punctured tire can be inflated and repaired effectively and reliably.

Although the present invention has been described with a certain degree of particularity, it is understood that the present disclosure is made by way of example only and the combination and arrangement of parts may be resorted to without departing from the spirit and scope of the invention hereinafter claimed.

I claim:

1. A sealant dispenser, comprising: a bottle being filled with a chemical sealant; a cap mounted to the bottle for covering a top opening of the bottle, the cap defining an air passage for receiving compressed air from an air compressor and defining a sealant passage for delivering the chemical sealant to an object; a control element mounted in the bottle for controlling the air passage and the sealant passage, wherein the air passage and the sealant passage are closed by the control element when the sealant dispenser is not in use; and a serving element pivotally mounted on the cap for actuating the control element to open the air passage and the sealant passage, so that the compressed air can flow into the bottle to deliver the chemical sealant to the object via the sealant passage, wherein the bottle has a flat bottom and defines therein an inner space which opens out at the top opening, the chemical sealant being contained in the inner space of the bottle; the cap is integrally formed with an upper pipe thereon and a lower pipe thereunder, the upper pipe being formed with two opposite supporting plates at its top, thus defining a gap between the supporting plates, each supporting plate defining a pivot hole, one of the supporting plates having an extension on which an engagement protrusion with a slant surface is provided, the upper and lower pipes respectively defining inner passages communicating with each other, the upper pipe being provided with an air input connection tube defining the air passage and provided with a sealant output connection tube defining the sealant passage, the cap being threadedly mounted to a neck portion of the bottle which defines the top opening; a compression spring is fitted into the upper pipe such that it is in contact with a step formed at the inner passage of the lower pipe; a non-circular elongated rod being fitted into the inner passages of the upper and lower pipes and inserted through the compression spring, the control element has a tube defining therein a central bore which opens out at a top opening thereof, the tube of the control element being provided with an inner stepped plug opposite to the top opening thereof and defining multiple gaps at its bottom, around the inner stepped plug, the lower pipe being inserted into the central bore of the tube of the control element via the top opening of the control element such that a lower end of the lower pipe is snugly fitted over the inner stepped plug and thus closes the inner passage of the lower pipe, and a lower end of the elongated rod is in contact with the inner stepped plug of the control element; the serving element is pivotally mounted to the pivot holes, between the supporting plates of the upper pipe, such that the serving element can swing about the pivotal holes in a semicircle; whereby a swing operation of the serving element allows the elongated rod to move the control element downwardly, so that the air passage of the air input connection tube and the inner passage of the lower pipe can be opened to allow the compressed air to flow into the inner space of the bottle to force the chemical sealant to flow into the inner passage of the lower pipe and the inner passage of the upper pipe and finally enter a punctured tire through the sealant passage and a hose connected to the sealant passage for inflating and repairing the punctured tire.

2. The sealant dispenser of claim 1, wherein the neck portion of the bottle is provided with external threads, and a recessed space constituting part of the inner space of the bottle is defined above the flat bottom of the bottle; the cap is provided at its inner surface with a short tube and defines at its inner surface an annular groove to be fitted with a gasket, the cap defining therein an intermediate channel, which allows the air passage to communicate with the short tube, the air passage of the air input connection tube communicating with the inner space of the bottle via the intermediate channel that communicates with the short tube, the sealant passage of the sealant output connection tube communicating with the inner passage of the upper pipe, the inner passage of the upper pipe generally having a diameter greater than the inner passage of the lower pipe.

3. The sealant dispenser of claim 2, wherein the bottom of the tube of the control element is formed with multiple strips, and the multiple gaps are defined between the strips, the inner stepped plug being attached to lower ends of the strips, the control element further having a stem extending upwardly from the end of the tube which defines the top opening, a distal end of the stem being formed into an upper plug which has a central pin and defines an annular cavity around the central pin, wherein the central pin can be inserted into the short tube of the cap to block the intermediate channel that communicates with the air passage of the air input connection tube, and the annular cavity can be snugly fitted around the short tube of the cap.

4. The sealant dispenser of claim 1, wherein the elongated rod has an enlarged top end defining an annular groove to be fitted with an O-ring, the elongated rod defining multiple longitudinal grooves along its path other than its top end, the compression spring being fitted around the elongated rod, between the top end and the step of the lower pipe.

5. The sealant dispenser of claim 4, wherein one end of the serving element is provided with an eccentric cam having two pivot pins at its two opposite sides, and an opposite end of the serving element is provided with an operating bar, the serving element being pivotally mounted on the cap by fitting the pivot pins into the pivot holes of the supporting plates of the upper pipe, such that the eccentric cam of the serving element urges against the top end of the elongated rod, and the operating lever facilitates the serving element to swing about the pivot holes in a semicircle for moving the elongated rod.

* * * * *